United States Patent
Sato et al.

(10) Patent No.: US 9,617,619 B2
(45) Date of Patent: Apr. 11, 2017

(54) HYDROMETALLURGICAL PROCESS FOR NICKEL OXIDE ORE

(71) Applicant: SUMITOMO METAL MINING CO., LTD., Tokyo (JP)

(72) Inventors: Yoshiteru Sato, Tokyo (JP); Isao Nishikawa, Tokyo (JP); Hirotaka Higuchi, Tokyo (JP); Izumi Sugita, Tokyo (JP); Osamu Nakano, Tokyo (JP)

(73) Assignee: SUMITOMO METAL MINING CO., LTD., Tokyo (JP)

( * ) Notice: Subject to any disclaimer, the term of this patent is extended or adjusted under 35 U.S.C. 154(b) by 0 days.

(21) Appl. No.: 14/777,678

(22) PCT Filed: Jan. 23, 2014

(86) PCT No.: PCT/JP2014/051320
§ 371 (c)(1),
(2) Date: Sep. 16, 2015

(87) PCT Pub. No.: WO2014/148097
PCT Pub. Date: Sep. 25, 2014

(65) Prior Publication Data
US 2016/0273071 A1    Sep. 22, 2016

(30) Foreign Application Priority Data

Mar. 19, 2013 (JP) ................................. 2013-056012
Sep. 20, 2013 (JP) ................................. 2013-195610

(51) Int. Cl.
*C22B 23/00* (2006.01)
*C22B 3/08* (2006.01)
*C22B 3/00* (2006.01)

(52) U.S. Cl.
CPC .............. *C22B 23/043* (2013.01); *C22B 3/08* (2013.01); *C22B 23/005* (2013.01); *Y02P 10/212* (2015.11)

(58) Field of Classification Search
CPC ........ C22B 23/043; C22B 23/005; C22B 3/08
See application file for complete search history.

(56) References Cited

FOREIGN PATENT DOCUMENTS

AU    2009200714 A1 *   9/2009
JP    H07286219 A     10/1995
(Continued)

OTHER PUBLICATIONS

Mar. 11, 2014 International Search Report issued in International Application No. PCT/JP2014/051320.

*Primary Examiner* — George Wyszomierski
*Assistant Examiner* — Tima M McGuthry Banks
(74) *Attorney, Agent, or Firm* — Oliff PLC

(57) ABSTRACT

Provided is a hydrometallurgical process for nickel oxide ore by high pressure acid leach that achieves a high iron oxidation ratio. The carbon grade in ore slurry and the flow rate are measured to determine the amount of carbon to be fed, and then, sulfuric acid is added. The blowing ratio of high pressure air and high pressure oxygen is adjusted so as to attain an oxygen purity of 21% to 60%. While the oxygen purity is maintained, an oxygen blowing amount per weight of carbon contained in the ore slurry and fed in the second step is adjusted to 200 to 600 $Nm^3$, whereby ORP (Ag/AgCl basis) in the leaching treatment is controlled to 400 to 650 mV.

6 Claims, 4 Drawing Sheets

(56) References Cited

FOREIGN PATENT DOCUMENTS

| | | | |
|---|---|---|---|
| JP | 2005281733 A | 10/2005 |
| JP | 2005-350766 A | 12/2005 |
| JP | 2009197298 A | 9/2009 |

\* cited by examiner

HYDROMETALLURGICAL PROCESS FOR NICKEL OXIDE ORE

BACKGROUND OF THE INVENTION

1. Field of the Invention

The present invention relates to a hydrometallurgical process for nickel oxide ore to leach out and recover nickel and cobalt from a nickel oxide ore by using acid under high temperature and pressure. The present application claims priority based on Japanese Patent Application No. 2013-056012 filed in Japan on Mar. 19, 2013, and Japanese Patent Application No. 2013-195610 filed in Japan on Sep. 20, 2013. The total contents of the Patent Application are to be incorporated by reference into the present application.

2. Description of Related Art

Conventionally, as a smelting process for recovering nickel and cobalt from a nickel oxide ore containing iron as a main component and having a nickel content of 1% to 2% by weight by separating nickel and cobalt from iron, for example, there has been performed a pyrometallurgical process by which a nickel oxide ore is roasted to reduce and sulfurize nickel components, and then, smelting is performed to produce a matte containing a nickel sulfide; or a reducing-roasting and leaching process by which a nickel oxide ore is reduction-roasted, and then, while ammonia complex ions are formed, nickel and cobalt are selectively leached out.

However, these smelting processes includes pyrometallurgical processing steps of drying and roasting a raw ore containing a large amount of free water, and furthermore, in the smelting processes, it is impossible to selectively reduce only nickel and cobalt, and therefore, there is a problem that the smelting processes lead to much waste in terms of energy and cost. Therefore, in opposition to these smelting processes, the development of a process capable of being performed simply and at low cost has been demanded.

In recent years, high pressure acid leach using sulfuric acid has been attracting attention as a hydrometallurgical process for nickel oxide ore. Unlike pyrometallurgical process, which is a conventional common smelting process for nickel oxide ore, this high pressure acid leach does not include pyrometallurgical steps, such as reduction and drying step, but comprises consistent hydrometallurgical steps, and thus, is advantageous in terms of energy and cost. Furthermore, the high pressure acid leach has an advantage that a nickel-cobalt containing sulfide whose nickel grade is increased to be up to approximately 50% by weight (hereinafter, also referred to as a "nickel-cobalt mixed sulfide") can be attained.

This high pressure acid leach comprises, for example: an ore slurry preparation step (which corresponds to a "first step" mentioned below) of grinding a nickel oxide ore as a raw material to a predetermined size to form slurry; a leaching step (which corresponds to a "second step" mentioned below) of adding sulfuric acid to the ore slurry and performing a leaching treatment under high temperature of not less than 200 degrees C. and high pressure by an autoclave or the like to obtain leach slurry; a solid-liquid separation step of separating a leach residue and a nickel-cobalt-containing leachate in the leach slurry; a neutralization step of adjusting the pH of the leachate containing impurity elements together with nickel and cobalt to form neutralization precipitate slurry containing impurity elements such as iron and a purified mother liquor for nickel recovery; and a sulfurization step of supplying a sulfurizing agent such as hydrogen sulfide gas to the mother liquor for nickel recovery to form a nickel-cobalt mixed sulfide and a barren liquor (for example, refer to Patent document 1).

The high pressure acid leach has a great advantage because, in the leaching step, the oxidation-reduction potential and the temperature of a leachate in a pressure leaching reaction vessel are controlled, whereby a major impurity, iron, is fixed as a leach residue in the form of hematite ($Fe_2O_3$), and nickel and cobalt can be selectively leached out in contrast to iron. On the other hand, the high pressure acid leach has a problem that, without a roasting step, a leaching treatment is directly applied to nickel oxide ores which exhibit wide variations in ore composition, organic component content, and the like, and therefore, depending on particularly the amount of organic components contained in nickel oxide ores, oxidation-reduction potential (ORP) at the time of leaching widely varies.

For example, in the case where oxidation-reduction potential at the time of leaching is too high, chromium contained in a nickel oxide ore is leached out in a state where the chromium is oxidized to be hexavalent. In order to remove this hexavalent chromium in downstream steps such as a neutralization treatment step and a wastewater treatment step, the chromium needs to be reduced to be trivalent using a reducing agent, and accordingly, an increase in smelting cost is inevitable. Unless a reduction treatment is given, a problem arises that chromium is contained as an impurity in a nickel or cobalt product, or chromium remains in a post-waste-water-treatment solution. On the other hand, in the case where oxidation-reduction potential at the time of leaching is too low, a problem arises that titanium which is used for an autoclave as a corrosion-resisting material is deteriorated, and in addition, a high-temperature hydrolysis reaction of iron is inhibited, whereby a large amount of iron remains in a leachate, an increase in the amount of a chemical agent used in a neutralization treatment step as a downstream step and an increase in the coprecipitation amount of nickel and cobalt, that is an increase in loss is caused.

To solve these problems, for example, there is disclosed a process by which at least one of sulfur and a carbon compound is added to ore slurry and the oxidation-reduction potential (Ag/AgCl basis) of a leachate is controlled to 400 to 600 mV to perform leaching (for example, refer to Patent document 2). This process is such that added sulfur and an added carbon compound act as reducing agents, whereby the oxidation-reduction potential is decreased and controlled to not more than 600 mV, at which the elution of hexavalent chromium is not caused. It should be noted that, when the oxidation-reduction potential is less than 400 mV, not only a poor oxidation hydrolysis reaction of iron is caused, but also the corrosion resistance of facility materials is impaired, and therefore, the amount of sulfur or a carbon compound added is adjusted to control the oxidation-reduction potential to 400 to 600 mV.

Furthermore, there is also disclosed a process by which, without adding a reducing agent, the mixing ratio of ores having different amounts of sulfur and a carbon compound contained is changed, whereby a target oxidation-reduction potential (Ag/AgCl basis) is controlled to 400 to 600 mV (for example, refer to Patent document 3).

In a leaching treatment in a leaching step using the process disclosed in the foregoing Patent document 2, leached-out iron is oxidized to hematite and hydrolyzed, and therefore, it is indispensable that, normally, high pressure air is used as an oxidizer and a reaction vessel is kept pressurized. However, conditions for using high pressure air in this process have not been disclosed. From a viewpoint that variation in oxidation-reduction potential due to variations in ore composition and organic component content is dealt with to prevent particularly a decrease in "iron oxidation ratio" to trivalent iron due to a decrease in oxidation-reduction potential and the elution of chromium, this process aims to lower oxidation-reduction potential by making added sulfur and an added carbon compound act as reducing agents, and therefore, an excessive amount of high pressure air is blown in to control oxidation-reduction potential. As a result, the amount of exhaust gas from a pressurized reaction vessel increases, thereby causing an increase in heat loss, and, to compensate the heat loss and maintain the temperature of the pressurized reaction vessel, the amount of high pressure vapor used for temperature control increases, thereby causing an increase in energy cost.

Furthermore, in a leaching treatment in a leaching step using the process disclosed in Patent document 3, in the first step of preparing ore slurry, the mixing ratio of ores having different amounts of sulfur and a carbon compound contained is changed, whereby, mainly, a target carbon grade of solids in the ore slurry is adjusted in advance, and thus, an excessive amount of high pressure air is prevented from being blown in at the time of a leaching treatment in the second step. However, ores have different ore compositions and different organic component contents, and therefore, not only the mixing ratio is limited, but also, depending on the mixing ratio, an increase in magnesium grade and aluminum grades of solids in ore slurry is caused. These impurities such as magnesium and aluminum react with sulfuric acid which is added in acid leaching in the second step, thereby consuming the sulfuric acid, and accordingly, the leaching rate of nickel and cobalt is decreased. To avoid such decrease, an excessive amount of sulfuric acid needs to be added, but, in this case, there arise problems of an increase in the amount of a chemical agent used in the neutralization treatment step as a downstream step and an increase in the coprecipitation amount of nickel and cobalt.

PRIOR ART

Patent Document

Patent document 1: Japanese Laid-Open Patent Publication 2005-350766
Patent document 2: Japanese Laid-Open Patent Publication 2005-281733
Patent document 3: Japanese Laid-Open Patent Publication 2009-197298

BRIEF SUMMARY OF THE INVENTION

The present invention is proposed in view of such actual circumstances, and an object of the present invention is to provide a hydrometallurgical process for nickel oxide ore by using high pressure acid leach, the hydrometallurgical process being capable of achieving a high iron oxidation ratio to fix a large part of iron as a major impurity to a leach residue in the form of hematite, reducing the cost of a chemical agent by controlling the amount of sulfuric acid used at the time of leaching, and leaching out nickel and cobalt at a high leaching rate.

The present inventors earnestly studied to achieve the foregoing object. As a result, the inventors found that, in accordance with the amount of carbon contained in ore slurry and fed in the second step, a part of high pressure air used for maintaining an oxidizing atmosphere is replaced by high pressure oxygen to enhance oxygen purity, and an oxygen blowing amount is maintained in a predetermined range, whereby the ORP of a liquid at the time of leaching can be controlled to be in an optimum range and the grades of magnesium and aluminum as impurities in acid leaching are kept low to make possible a reduction in the amount of sulfuric acid used, and the inventors accomplished the present invention.

That is, a hydrometallurgical process for nickel oxide ore according to the present invention comprises: a first step of slurrying a nickel oxide ore to prepare ore slurry; and a second step of adding sulfuric acid to the ore slurry and applying a leaching treatment using high pressure air and high pressure vapor to obtain a leachate containing nickel and cobalt; wherein, in the second step, a blown gas made up of high pressure air and high pressure oxygen is adjusted so as to attain an oxygen purity of 21% to 60%, and, while the oxygen purity is maintained, an oxygen blowing amount is adjusted to 200 to 600 [$Nm^3$-$O_2$/t-C]per ton carbon amount which is contained in the ore slurry and fed in the second step, whereby the oxidation-reduction potential (Ag/AgCl basis) in a leaching treatment is controlled to 400 to 650 mV.

Furthermore, the hydrometallurgical process for nickel oxide ore according to the present invention is characterized in that, in the first step, the carbon grade of solids in the ore slurry is adjusted to 0.1% to 0.5% by weight by the blending ratio of nickel oxide ores which have different carbon grades and constitute the ore slurry.

Furthermore, the hydrometallurgical process for nickel oxide ore according to the present invention is characterized in that, in the second step, the partial pressure of oxygen in a leaching vessel to perform a leaching treatment is adjusted to 100 to 400 kPaG.

Furthermore, the hydrometallurgical process for nickel oxide ore according to the present invention is characterized in that, in the second step, high pressure air and high pressure oxygen are mixed in advance so as to attain the foregoing blowing ratio, and then, blown into a leaching vessel.

Furthermore, the hydrometallurgical process for nickel oxide ore according to the present invention is characterized in that the iron oxidation ratio in the leachate obtained in the second step is not less than 90%.

Furthermore, the hydrometallurgical process for nickel oxide ore according to the present invention is characterized in that the amount of sulfuric acid used in the second step is 200 to 250 [kg-$H_2SO_4$/t-dry Solid] per ton of dry ore for the nickel oxide ore fed to be subjected to a leaching treatment.

The hydrometallurgical process for nickel oxide ore according to the present invention enables a large part of iron as an impurity to be oxidized at a high oxidation ratio and fixed as a leach residue in the form of hematite. Furthermore, an increase in throughput of an ore having a high carbon grade, which was conventionally difficult due to the inhibition of iron oxidation, is made possible, and accordingly, the grades of magnesium, aluminum, and the like can be kept low, whereby the amount of sulfuric acid used can be reduced, and in addition, nickel and cobalt can be leached out at a high leaching rate.

DETAILED DESCRIPTION OF THE INVENTION

Figure 1:
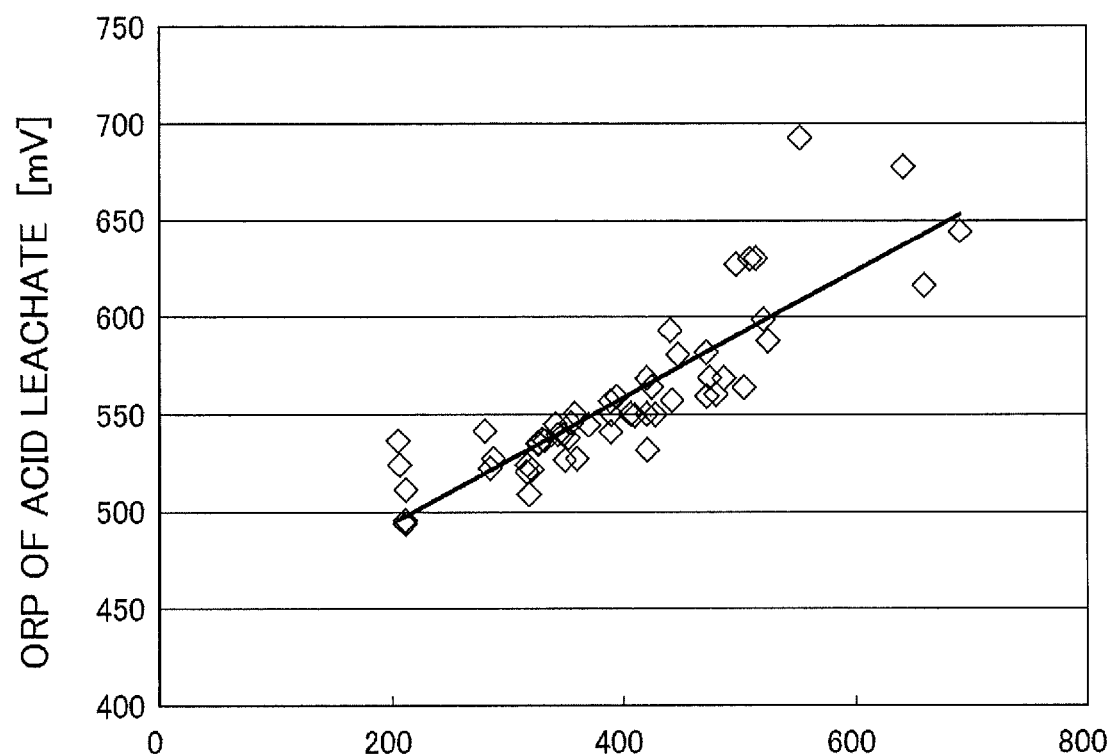
FIG. 1 is a graph showing a relationship between an oxygen blowing amount per ton of unit carbon contained in treated ore slurry and the oxidation-reduction potential (ORP) of an acid leachate in Example 1.

Hereinafter, a specific embodiment of the hydrometallurgical process for nickel oxide ore according to the present invention (hereinafter, referred to as "the present embodiment") will be described in detail. It should be noted that the present invention is not limited to the following embodiment, and various changes can be made within the scope not deviating from the gist of the present invention.

The hydrometallurgical process for nickel oxide ore according to the present embodiment (hereinafter, also simply referred to as "the hydrometallurgical process") comprises: a first step of slurrying a nickel oxide ore to prepare ore slurry; and a second step of adding sulfuric acid to the prepared ore slurry and applying a leaching treatment using high pressure air and high pressure vapor to obtain a leachate containing nickel and cobalt.

In this hydrometallurgical process, first, the amount of carbon contained in the ore slurry produced in the first step and fed in the second step is measured. The carbon amount can be measured by measuring a carbon grade in the ore slurry and a flow rate. Then, in the second step, the blowing ratio of high pressure air and high pressure oxygen is adjusted so as to attain an oxygen purity of 21% to 60%, and, with adjusting an oxygen blowing amount to 200 to 600 [$Nm^3$-$O_2$/t-C] per unit weight of carbon contained in the ore slurry, the oxidation-reduction potential (Ag/AgCl basis) in a leaching treatment is controlled to 400 to 650 mV.

As mentioned above, in the hydrometallurgical process according to the present embodiment, it is important that, in the leaching treatment of the second step, in accordance with the amount (weight) of carbon fed in the step, the oxygen purity of blown gas made up of high pressure air and high pressure oxygen is adjusted, and an oxygen blowing amount of the blown gas having an oxygen purity adjusted as predetermined is adjusted.

The carbon amount can be calculated by measuring, with a well-known method, the carbon grade and the flow rate of the ore slurry on the way of transport from the first step to the second step. For example, the carbon grade can be calculated using a common carbon-sulfur analyzer which carry out a measurement by high-frequency combustion under oxygen flow and using an infrared-absorbing analysis method. The flow rate can be calculated from measured values of a densimeter and an electromagnetic flowmeter.

This makes it possible that, in accordance with the amount of carbon in ore slurry, the partial pressure of oxygen in a pressurized reaction vessel (a leaching vessel) to perform a leaching treatment is adjusted and the oxidation-reduction potential (Ag/AgCl basis) of a leachate is controlled to 400 to 650 mV. Furthermore, this makes it possible that a large part of iron as a major impurity is oxidized at a high oxidation ratio (high iron oxidation ratio), thereby being fixed as a leach residue in the form of hematite ($Fe_2O_3$), and nickel and cobalt are leached out at a high leaching rate with a reduced amount of sulfuric acid used.

(First Step)

First, in the first step, a nickel oxide ore is slurried to prepare ore slurry as mentioned above.

As the nickel oxide ore serving as a raw material, what is called laterite ore, such as limonite ore and saprolite ore, is mainly used. The nickel content of this laterite ore is usually 0.5% to 3.0% by weight, and nickel is contained in the form of hydroxide or magnesium silicate mineral. Furthermore, the iron content of the laterite ore is 10% to 50% by weight, and iron is contained mainly in the form of trivalent hydroxide (goethite, FeOOH), but, a magnesium silicate mineral contains some divalent iron.

In this first step, the foregoing nickel oxide ore is crushed and ground underwater to be slurried. After that, for example, using a solid-liquid separation apparatus such as a thickener, excess water in the slurry is removed for concentration to prepare ore slurry having a predetermined concentration. At this time, in the first step, the carbon grade of solids in the ore slurry may be adjusted to a predetermined range by the mixing ratio of plural kinds of nickel oxide ores which contain different amounts of carbon and serve as raw materials.

Here, in a conventional hydrometallurgical process by high pressure acid leach, in the case where some kinds of mined nickel oxide ores which contain a comparatively large amount of organic components are mixed in at a high ratio, the oxidation-reduction potential at the time of leaching considerably has decreased. Then, such decrease in oxidation-reduction potential inhibits an oxidation reaction of iron in an ore from being accelerated, and accordingly, a large amount of divalent iron ions remains in a leachate, and as a result, it becomes difficult to separate iron from a crude sulfuric acid solution (a nickel-cobalt mixed solution) in a downstream step, or the cost of operation materials necessary for the separation has been increased. Furthermore, the corrosion-resistance of a pressurized reaction vessel and incidental equipment has been deteriorated.

Therefore, in a leaching treatment in the later-mentioned second step, it is important to maintain the oxidation-reduction potential in an optimum range. Specifically, the oxidation-reduction potential (Ag/AgCl basis) of a solution at the time of leaching is preferably controlled to 400 to 650 mV, more preferably controlled to 500 to 600 mV. That is, an oxidation-reduction potential of less than 400 mV at the time of leaching causes not only a poor oxidation reaction of iron, but also an impairment of corrosion resistance of equipment materials. On the other hand, when the oxidation-reduction potential is more than 650 mV, divalent iron in an acid leachate is approximately completely oxidized to trivalent iron, and at the same time, chromium is oxidized to hexavalent chromium, and accordingly a problem arises that chromium is contained as an impurity in a nickel or cobalt product, or chromium remains in a post-waste-water-treatment solution.

Therefore, first, to grasp the amount of carbon per unit time (ton/time) which is fed in the later-mentioned second step, the grade (% by weight) of carbon contained in produced ore slurry is measured, and in addition, a flow rate per unit time (ton/time) fed in the second step is measured. From measured values of a carbon grade and a flow rate per unit time, the amount (A) of carbon per unit time is calculated and grasped.

The grade (% by weight) of carbon contained in the ore slurry is not particularly limited, but, to stabilize the amount of carbon per unit time, the carbon grade of solids in the ore slurry is preferably adjusted to 0.1% to 0.5% by weight, more preferably 0.15% to 0.20% by weight.

As a process for adjusting the carbon grade of solids in the ore slurry, for example, there is a process by which the carbon grades of plural kinds of nickel oxide ores to be treated are periodically analyzed, and, based on the analysis results, a mixing ratio is determined to blend the nickel oxide ores.

When the carbon grade of solids in the ore slurry varies, particularly when the carbon grade varies in a wider range than the foregoing range, the amount of carbon per unit time varies more widely, and accordingly, in the second step, the concentration of oxygen to be blown in is higher and a range of adjusting a flow rate is wider, which are disadvantageous for equipment performance and life.

The slurry concentration of the ore slurry prepared in the first step is not particularly limited because the concentration is greatly dependent on the properties of a treated nickel oxide ore, but, a higher slurry concentration of the leach slurry is preferable, and the concentration is usually adjusted to approximately 25% to 45% by weight. That is, in the case of a slurry concentration of less than 25% by weight, at the time of leaching, larger size equipment is needed in order to obtain the same residence time, and in addition, the amount of acid added increases for adjustment of a residual acid concentration. Furthermore, the nickel concentration of an obtained leachate decreases. On the other hand, in the case of a slurry concentration of more than 45% by weight, the size of equipment can be reduced, but the viscosity (yield stress) of slurry itself is higher, and accordingly, difficulties in transportation (frequent occurrence of pipe blockages, a need for more energy, and the like) arise.

(Second Step)

Next, in the second step, sulfuric acid is added to the ore slurry, and high pressure air as an oxidizer and high pressure vapor as a heating source are blown thereinto, and then, a leaching treatment is applied with agitation under a pressure and a temperature controlled as predetermined, whereby leach slurry comprising a leachate containing nickel and cobalt and a leach residue is obtained.

Specifically, pressurization is carried out at approximately 3 to 6 MPaG under a high temperature condition of approximately 220 to 280 C.°, whereby the ore slurry is agitated to form the leach slurry. Therefore, in this leaching treatment, a high temperature pressurizer (a pressurized reaction vessel) (autoclave) is employed so that these treatment conditions can be satisfied.

In this second step, leaching reactions expressed by the following formulas (1) to (3) and high temperature hydrolysis reactions expressed by the following formulas (4) and (5) occur, whereby nickel, cobalt, and the like are leached out in the form of sulfate and a leached-out iron sulfate is fixed as hematite. It should be noted that, since the fixation of iron ions does not completely proceed, besides nickel, cobalt, and the like, divalent and trivalent iron ions are usually contained in a liquid portion of an obtained leach slurry.

"Leaching Reaction"

$$MO + H_2SO_4 \rightarrow MSO_4 + H_2O \quad (1)$$

(where M in the formula represents Ni, Co, Fe, Zn, Cu, Mg, Cr, Mn, or the like.)

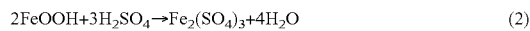

$$2FeOOH + 3H_2SO_4 \rightarrow Fe_2(SO_4)_3 + 4H_2O \quad (2)$$

$$FeO + H_2SO_4 \rightarrow FeSO_4 + H_2O \quad (3)$$

"High Temperature Hydrolysis Reaction"

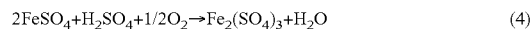

$$2FeSO_4 + H_2SO_4 + 1/2O_2 \rightarrow Fe_2(SO_4)_3 + H_2O \quad (4)$$

$$Fe_2(SO_4)_3 + 3H_2O \rightarrow Fe_2O_3 + 3H_2SO_4 \quad (5)$$

The temperature in this leaching treatment is not particularly limited, but, as mentioned above, preferably 220 to 280 C.°, more preferably 240 to 270 C.°. The reactions performed in such temperature range enable iron to be fixed as hematite. A temperature of less than 220 C.° is not appropriate because such temperature causes the velocity of the high temperature hydrolysis reactions to be low, and accordingly, dissolved iron remains in a reaction solution, whereby the load on the neutralization step as a downstream step to remove iron increases and it becomes very difficult to separate iron from nickel. On the other hand, a temperature of more than 280 C.° leads to acceleration of the high temperature heat hydrolysis reactions themselves, but, causes not only difficulties in selection of a material for a vessel used for high temperature pressurization leach, but also an increase in the cost of high pressure vapor for temperature increase.

Furthermore, the amount of sulfuric acid added is not particularly limited, but, preferably, for example, approximately 200 to 250 kg per ton of ore. A too large amount of sulfuric acid added per ton of ore causes an increase in cost involved in the use of sulfuric acid and causes an increase in the amount of a neutralizer used in the neutralization step as a downstream step, which is not preferable.

It should be noted that, from a viewpoint of the filterability of a hematite-containing leach residue formed in the solid-liquid separation step, the pH of an obtained leachate is preferably adjusted to 0.1 to 1.0.

Here, according to a conventional process, it was difficult to control the oxidation-reduction potential to not more than 650 mV without the blowing-in of an excessive amount of high pressure air. Specifically, an air blowing amount needed to be 700 to 800 $Nm^3$ per unit weight (1 ton) of carbon in solids in ore slurry.

Furthermore, when the blending ratio of plural kinds of nickel oxide ores is changed in order to reduce as much as possible a carbon grade related to the unit weight of carbon, the amount of impurities, such as magnesium and aluminum, contained in solids is increased. Then, in the leaching reaction, sulfuric acid is consumed by these impurities, and accordingly an excessive amount of sulfuric acid to compensate with the consumption needs to be added, and the leaching rate of nickel and cobalt to be leached out considerably decreases with respect to the amount of sulfuric acid added. Furthermore, to maintain an oxidizing atmosphere at the time of the leaching reaction, a more excessive amount of high pressure air needs to be blown in.

Therefore, in the hydrometallurgical process according to the present embodiment, in accordance with the amount of carbon per unit time (ton/time) which is fed in the second step, the purity of oxygen to be blown in is adjusted to a predetermined value. Specifically, using high pressure oxygen together with high pressure air, a blowing ratio of the high pressure oxygen to the high pressure air is adjusted so as to attain an oxygen purity (concentration) of 21% to 60%. This allows the partial pressure of oxygen in a pressurized reaction vessel to be adjusted to 100 to 400 kPaG, and allows an impact of an oxidation reaction on iron to be controlled, whereby an excessive variation can be prevented.

In the case where the oxygen purity is less than 21%, that case is almost the same as a case in which only high pressure air is blown in, and thus, an excessive amount of high pressure air needs to be blown in, and at the same time, the carbon grade of an ore blended into ore slurry needs to be kept low as much as possible, and accordingly, the grades of impurities, such as magnesium and aluminum, increase. On the other hand, an oxygen purity of more than 60% leads to an excessive oxidizing atmosphere, and therefore, it is difficult that the oxidation-reduction potential is controlled to be in a range of 400 to 650 mV, whereby chromium in the ore is oxidized to impair the quality of a product.

As for the adjustment of the blowing-in ratio of high pressure air to high pressure oxygen, in accordance with the amount of carbon per unit time (ton/time) which is fed in the second step, the amount being determined from the foregoing carbon grade and a flow rate per unit time, the supply ratio (proportion) of high pressure air to high pressure oxygen is adjusted so as to attain an oxygen blowing amount of 200 to 600 [$Nm^3$-$O_2$/t-C] per the carbon amount.

Specifically, in the case where the amount of carbon per unit time increases, the ratio of high pressure oxygen is increased within the foregoing range of oxygen purity, and the total amount of gas blown in the second step is prevented from being increased, whereby there are avoided an increase in heat loss involved in an increase in the amount of exhaust gas, and in addition avoided, an increase in energy cost involved in an increase in the amount of high pressure vapor used to be blown in the second step.

Furthermore, the blowing-in of high pressure air and high pressure oxygen is preferably performed in such manner that, for example, high pressure air and high pressure oxygen are mixed in advance in a mixing pipe or the like (preliminary mixing) so as to attain a blowing ratio satisfying the foregoing oxygen purity, and then, a mixed gas thereof is blown into a pressurized reaction vessel. Here, high pressure oxygen is supplied from an oxygen production plant or the like into a leaching vessel via a pipe made of titanium (Ti), for example. It should be noted that titanium (Ti) is a material which is suitably used as a lining material or the like for an autoclave in order to industrially perform this hydrometallurgical process. The pipe is provided with a non-return valve such as a check valve, and cutting chips which are cut off by the check valve sometimes cut off a part of an oxide film (TiO) formed in a Ti pipe. When an oxide film formed in a Ti pipe is thus cut off, a cut-off portion directly touches high pressure oxygen, for example, having a concentration of not less than 90% supplied to the cut-off portion, and sometimes oxygen and titanium sharply react together to cause a damage to the pipe. At this time, high pressure oxygen to be blown in is mixed with high pressure air in advance at a predetermined ratio and then supplied via the pipe, whereby the pipe can be prevented from touching high concentration oxygen, thereby being prevented from being damaged. Furthermore, from a viewpoint of preventing such damage to the pipe, although the preliminary mixing may be performed so as to attain the foregoing oxygen purity of 21% to 60%, it is preferable to perform preliminary mixing with the oxygen purity up to approximately 30%.

As high pressure air and high pressure oxygen to be blown in, high pressure gas commonly used for industry may be used, for example, gas with a pressure of 3 to 6 MPaG may be used. It should be noted that, also as for high pressure vapor, high pressure vapor commonly used for industry may be used, for example, vapor with a pressure of 3 to 6 MPaG may be used.

An adjustment of the partial pressure of oxygen in a pressurized reaction vessel is made in such a manner that, in order to control the oxidation-reduction potential of a leachate to a predetermined value, the blowing ratio of high pressure air to high pressure oxygen is adjusted as mentioned above to attain the purity of blown oxygen in a predetermined range. In a normal operation, carbon dioxide formed in the leaching is purged as it is into the pressurized reaction vessel, whereby an oxidizing atmosphere can be maintained. Therefore, using an automatic pressure control system provided in the pressurized reaction vessel, formed carbon dioxide is preferably timely discharged by being accompanied by generated exhaust gas. Thus, the partial pressure of oxygen in the pressurized reaction vessel can be appropriately adjusted to a range of 100 to 400 kPaG, whereby creation of an excessive oxidizing atmosphere can be prevented.

Furthermore, in the hydrometallurgical process according to the present embodiment, while the mixing ratio of high pressure air to high pressure oxygen is kept constant to maintain the foregoing oxygen purity, the blowing amount of high pressure air and the blowing amount of high pressure oxygen are changed in accordance with ore slurry throughput, whereby an adjustment is carried out so as to attain a predetermined oxygen blowing amount.

Specifically, the oxygen blowing amount is adjusted to 200 to 600 [$Nm^3$-$O_2$/t-C] per unit weight of carbon contained in ore slurry. Thus, also in a continuous leaching reaction, the oxidizing atmosphere in the pressurized reaction vessel is stably controlled to a predetermined value, whereby the oxidation-reduction potential of a leachate can be efficiently controlled to be in a range of 400 to 650 mV. Then, this allows an iron oxidation ratio (Fe(III)/Fe Total× 100), which represents a ratio of a trivalent iron ion concentration to a total iron ion concentration in a leachate, to be not less than 90%, and particularly, in the case where the foregoing carbon grade of solids in the ore slurry is not more than 0.15% by weight, an iron oxidation ratio of approximately 100% is attained, whereby iron in an ore can be effectively fixed in the form of hematite as a leach residue.

As for the foregoing oxygen blowing amount, an oxygen blowing amount of less than 200 $Nm^3$ causes a decrease in the oxidation-reduction potential of a leachate, whereby it is difficult to control the oxidation-reduction potential to not less than 400 mV. Thus, not only a poor oxidation hydrolysis reaction of iron is caused, but also the corrosion resistance of facility materials could be impaired. On the other hand, in the case where the oxygen blowing amount is more than 600 $Nm^3$, although the oxidation-reduction potential of a leachate increases, heat loss increases with an increase in the amount of exhaust gas, and accordingly the amount of high pressure vapor used for maintaining temperature increases.

As mentioned above, in the hydrometallurgical process according to the present embodiment, high pressure oxygen is blown in together with high pressure air to maintain an oxidizing atmosphere, that is, a part of high pressure air to be blown in is replaced by high pressure oxygen, whereby the purity of oxygen blown into a pressurized reaction vessel is increased to 21% to 60%, and while the oxygen purity is maintained, the oxygen blowing amount per the amount of carbon per unit time is controlled to 200 to 600 $Nm^3$. Thus, the oxidation-reduction potential (Ag/AgCl basis) of a solution at the time of the leaching is controlled to be in an optimum range of 400 to 650 mV, whereby a high iron oxidation ratio to trivalent iron can be achieved.

Furthermore, this makes it possible to increase the carbon grade of a treated ore. That is, an increase in throughput of an ore having a high carbon grade, which was conventionally difficult due to the inhibition of iron oxidation, is made possible, and accordingly, the grades of magnesium, aluminum, and the like can be kept low. Therefore, in a leaching reaction, the consumption of sulfuric acid by these impurities such as magnesium and aluminum can be reduced, whereby the amount of sulfuric acid used can be reduced, and at the same time, the inhibition of leaching of nickel and cobalt (the coprecipitation of nickel and cobalt into a leach residue) can be prevented. Furthermore, the amount of sulfuric acid used can be thus reduced, and therefore, in the neutralization step as a downstream step, the amount of a chemical agent (neutralizer) used for a neutralization treatment can be also reduced, and the cost of the chemical agent used in the operation can be reduced.

EXAMPLES

Hereinafter, the present invention will be described in more details by Examples and Comparative Examples of the present invention, but, the present invention is not limited to these examples.

It should be noted that metals used in Examples and Comparative Examples were analyzed using ICP atomic emission spectrometry (Inductively Coupled Plasma Atomic Emission Spectroscopy). Furthermore, a carbon grade was measured by a common carbon-sulfur analyzer to perform a measurement by high frequency combustion under oxygen flow and using an infrared-absorbing analysis method, and a flow rate was calculated from measured values of a densimeter and an electromagnetic flowmeter.

(Outlines)

The outlines of Examples and Comparative Examples are as follows. That is, a nickel oxide ore having a carbon (C) grade of not more than 0.3% by weight, a nickel grade of 1.15% to 1.35% by weight, and an iron grade of 40% to 46% by weight of solids in ore slurry was made into slurry having a solid ratio of approximately 40% to 45% by weight, and the slurry was fed into a pressurized reaction vessel to continuously perform a leaching reaction.

At this time, sulfuric acid was added so as to attain a free sulfuric acid concentration of approximately 50 g/l in a post-reaction solution, and at the same time, approximately 5 MPaG of high pressure vapor was blown thereinto, and with agitation, a temperature of 245 C.° was maintained, and the iron concentration and the oxidation-reduction potential (ORP) (Ag/AgCl electrode basis) of obtained leach slurry were measured.

In Examples, approximately 5 MPaG of high pressure air and high pressure oxygen were blown into the pressurized reaction vessel with the oxygen purity adjusted to be within a range of 21% to 60%. On the other hand, in Comparative Examples, high pressure oxygen was not blown in and only high pressure air was blown in, and accordingly, the oxygen purity was 20%. Furthermore, in Examples, the blowing-in was able to be carried out in an oxygen blowing amount of 200 to 600 $Nm^3$ per ton of the carbon amount (A), and as a result, the partial pressure of oxygen in the vessel was 100 to 350 kPaG.

On the other hand, in Comparative Example 2, due to a high carbon load, oxygen was blown in an oxygen blowing amount of only 167 $Nm^3$ per ton of carbon in solids of the ore slurry, and as a result, the partial pressure of oxygen in the vessel was approximately 90 kPaG.

In Examples, the amount of sulfuric acid used was 200 to 235 kg per ton of dry ore, on the other hand, in Comparative Examples, the amount of sulfuric acid used was not less than 240 kg.

Furthermore, calcium carbonate slurry was added to obtained leach slurry to remove trivalent Fe ions by oxidation and neutralization, whereby the concentration of divalent Fe remaining in a neutralization solution was analyzed. Based on analysis results of the divalent Fe concentration, the iron oxidation ratio ((trivalent iron concentration/total iron concentration)×100) of a leachate was determined using the total Fe concentration of the leachate in the leach slurry, the divalent Fe concentration of the neutralization solution, and the trivalent Fe concentration of the leachate which was obtained by counting backwards from a solution amount.

FIG. 1 shows an oxygen blowing amount per ton of unit carbon contained in treated ore slurry and the oxidation-reduction potential of an acid leachate in a pressurized reaction vessel (autoclave). It was found that, independently of (not limited to) the carbon grade of an ore, when an oxygen blowing amount per ton of unit carbon contained in treated ore slurry was in a range of 200 to 600 [$Nm^3$/t-C], the oxidation-reduction potential of an acid leachate was 500 to 650 mV.

Figure 2:
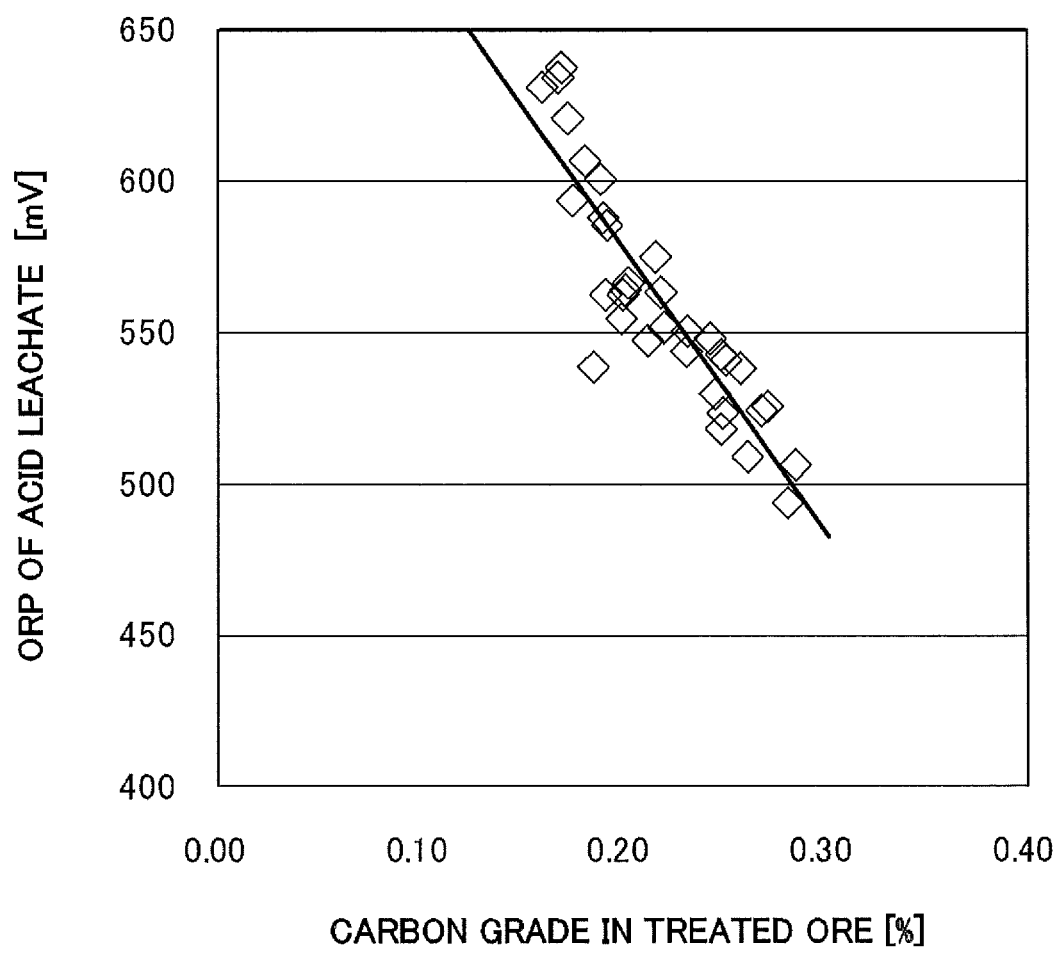
FIG. 2 is a graph showing a relationship between the carbon grade of an ore and the oxidation-reduction potential (ORP) of an acid leachate in Example 1.
Figure 3:
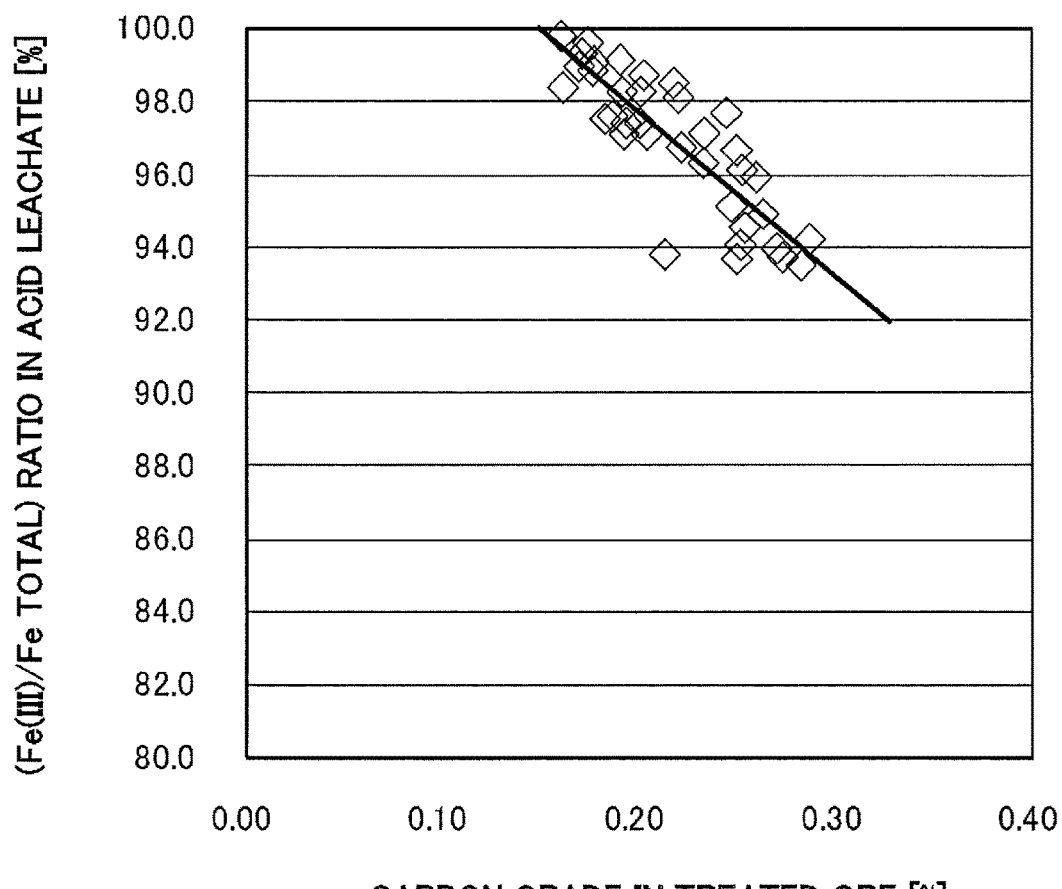
FIG. 3 is a graph showing a relationship between the carbon grade of an ore and an (Fe(III)/Fe total) ratio indicating an iron oxidation ratio in Example 1.

On the other hand, a relationship between the carbon grade of an ore and the ORP of an acid leachate is as follows. FIG. 2 and FIG. 3 show measurement results. FIG. 2 is a graph showing the relationship between the carbon grade of an ore and the ORP of an acid leachate, and FIG. 3 is a graph showing a relationship between the carbon grade of an ore and an (Fe(III)/Fe total) ratio indicating an iron oxidation ratio.

As shown in the graphs of FIG. 2 and FIG. 3, it is understood that, when the carbon grade of an ore is 0.15% to 0.30% by weight, the oxidation-reduction potential of a leachate is, of course, 500 to 650 mV, and the iron oxidation ratio of the leachate is not less than 90%. Furthermore, it is understood that, when the carbon grade of an ore is not more than 0.15% by weight, the iron oxidation ratio of a leachate is 100%.

Figure 4:
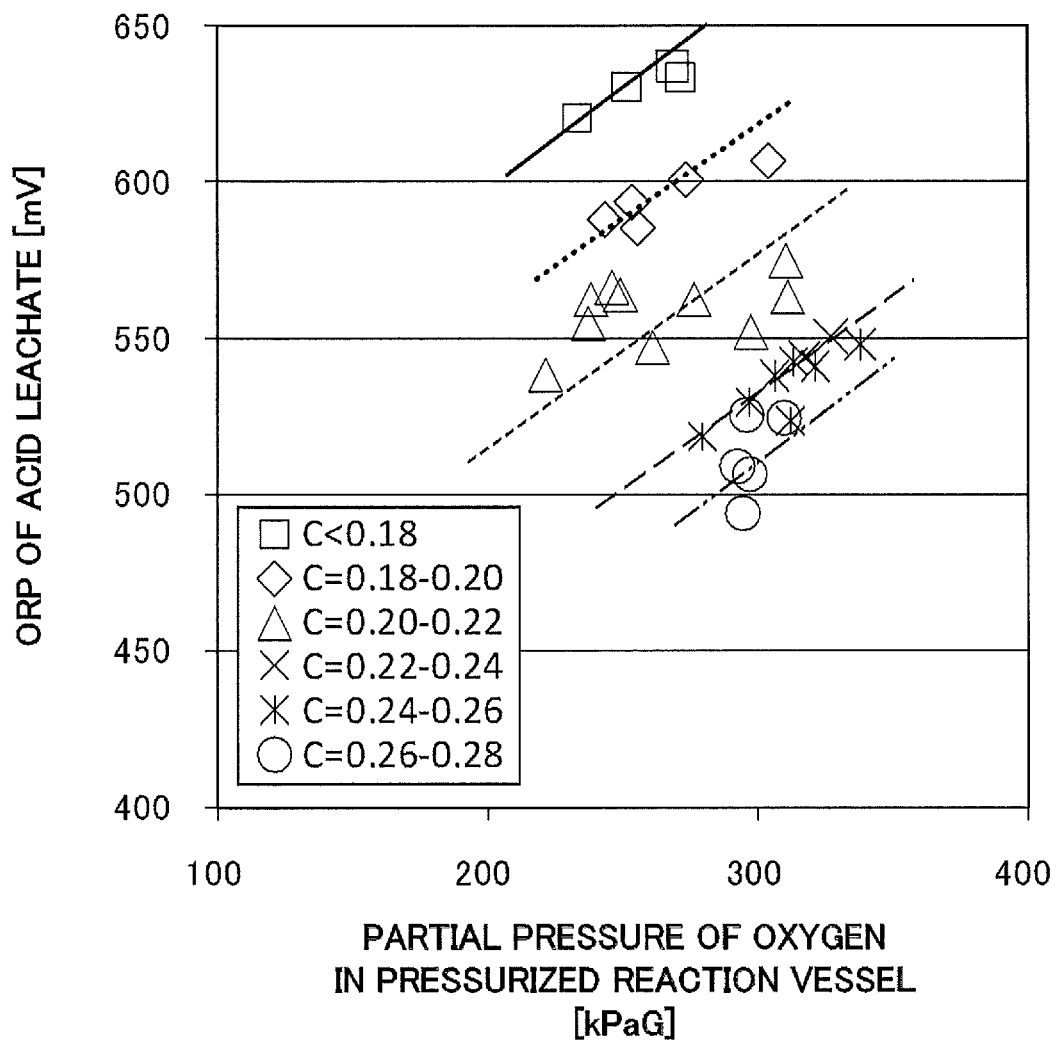
FIG. 4 is a graph showing a relationship between the partial pressure of oxygen in a pressurized reaction vessel and the oxidation-reduction potential (ORP) of an acid leachate in Example 1.

Furthermore, FIG. 4 is a graph showing a relationship between the partial pressure of oxygen in a pressurized reaction vessel and the ORP of an acid leachate. As shown in this graph in FIG. 4, it is understood that, by increasing the oxygen purity of gas blown into the vessel and increasing an oxygen blowing amount to increase the partial pressure of oxygen in the pressurized reaction vessel, the ORP of a leachate increases in proportion to the increase in the partial pressure of oxygen. Furthermore, it is understood that this ORP is affected by the carbon grade of solids in ore slurry fed into the reaction vessel, and therefore, in order to maintain a fixed ORP, it is necessary to adjust the partial pressure of oxygen in the pressurized reaction vessel.

Examples 1 to 4, Comparative Examples 1 and 2

Example 1

In Example 1, an operation was performed in such a manner that the carbon (C) grade of solids was 0.22% by weight, and approximately 5 MPaG of high pressure air and high pressure oxygen whose oxygen purity was adjusted to 46.6% were blown in an oxygen blowing amount of 426 $Nm^3$ per ton of the carbon amount, and the partial pressure of oxygen in the vessel was adjusted to 277 kPaG. It should be noted that, while approximately 5 MPaG of high pressure vapor was blown in and a temperature of 245 C.° was maintained under agitation, the operation was performed.

As a result, the ORP (Ag/AgCl electrode basis) of obtained leach slurry was suitably maintained at 559 mV, and the amount of sulfuric acid used per ton of dry ore was suitably 226 kg.

Example 2

In Example 2, an operation was performed in such a manner that the carbon (C) grade of solids was 0.23% by weight, and approximately 5 MPaG of high pressure air and high pressure oxygen whose oxygen purity was adjusted to 47.8% were blown in in an oxygen blowing amount of 317 Nm$^3$ per ton of the carbon amount, and the partial pressure of oxygen in the vessel was adjusted to 277 kPaG. It should be noted that, while approximately 5 MPaG of high pressure vapor was blown in and a temperature of 245 degrees C. was maintained under agitation, the operation was performed.

As a result, the ORP (Ag/AgCl electrode basis) of obtained leach slurry was suitably maintained at 518 mV, and the amount of sulfuric acid used per ton of dry ore was suitably 219 kg.

Example 3

In Example 3, an operation was performed in such a manner that the carbon (C) grade of solids was 0.24% by weight, and approximately 5 MPaG of high pressure air and high pressure oxygen whose oxygen purity was adjusted to 54.7% were blown in in an oxygen blowing amount of 412 Nm$^3$ per ton of the carbon amount, and the partial pressure of oxygen in the vessel was adjusted to 325 kPaG. It should be noted that, while approximately 5 MPaG of high pressure vapor was blown in and a temperature of 245 C.° was maintained under agitation, the operation was performed.

As a result, the ORP (Ag/AgCl electrode basis) of obtained leach slurry was suitably maintained at 528 mV, and the amount of sulfuric acid used per ton of dry ore was suitably 232 kg.

Example 4

In Example 4, an operation was performed in the same manner as in Example 1, except that, using a commercially-available gas mixing apparatus, high pressure air and high pressure oxygen were preliminarily mixed.

As a result, the same favorable results as in Example 1 were obtained.

Comparative Example 1

In Comparative Example 1, an operation was performed in such a manner that the carbon (C) grade of solids was 0.14% by weight, and approximately 5 MPaG of high pressure air (having an oxygen purity of 20.0%) only was blown in. Accordingly, the oxygen blowing amount was 285 Nm$^3$ per ton of the carbon amount, and the partial pressure of oxygen in the vessel was 101 kPaG. It should be noted that, while approximately 5 MPaG of high pressure vapor was blown in and a temperature of 245 C.° was maintained under agitation, the operation was performed.

As a result, the ORP (Ag/AgCl electrode basis) of obtained leach slurry was suitably maintained at 670 mV, but, the amount of sulfuric acid used per ton of dry ore was larger, namely 292 kg. This is considered because, in order to maintain the ORP in a suitable range, the carbon (C) grade of solids was set lower, whereby the grade of Mg+Al in the solids in the ore slurry became higher, and as a result, sulfuric acid was consumed.

Comparative Example 2

In Comparative Example 2, an operation was performed in such a manner that the carbon (C) grade of solids was 0.24% by weight, and approximately 5 MPaG of high pressure air (having an oxygen purity of 20.0%) only was blown in. Accordingly, the oxygen blowing amount was 167 Nm$^3$ per ton of the carbon amount, and the partial pressure of oxygen in the vessel was 90 kPaG. It should be noted that, while approximately 5 MPaG of high pressure vapor was blown in and a temperature of 245 C.° was maintained under agitation, the operation was performed.

As a result, the ORP (Ag/AgCl electrode basis) of obtained leach slurry was lower, namely 473 mV. Furthermore, the amount of sulfuric acid used per ton of dry ore was 240 kg, and the carbon (C) grade of solids was higher than that of Comparative Example 3. This is because the oxygen blowing amount per ton of the carbon amount was lower than 200 Nm$^3$, thereby causing a decrease in ORP, and accordingly, the amount of sulfuric acid reproduced by a high temperature hydrolysis reaction of iron in an autoclave decreased, and therefore, in order to maintain a free acid concentration necessary for leaching, sulfuric acid was additionally added.

(Results)

The following Table 1 collectively shows the treatment results in Examples and Comparative Examples.

TABLE 1

|  | Example 1 Example 4 | Example 2 | Example 3 | Comparative Example 1 | Comparative Example 2 |
| --- | --- | --- | --- | --- | --- |
| C grade of solids in ore slurry [%] | 0.22 | 0.23 | 0.24 | 0.14 | 0.24 |
| Supply amount of carbon in ore slurry [t/H] | 0.33 | 0.35 | 0.36 | 0.21 | 0.36 |
| Mg + Al grade of solids in ore slurry [%] | 2.92 | 2.72 | 3.04 | 3.48 | 3.04 |
| Blown oxygen purity [%] | 47 | 48 | 55 | 20 | 20 |
| Blown oxygen flow rate [Nm$^3$-O$_2$/h] | 141 | 109 | 148 | 60 | 60 |
| Blown oxygen flow rate [Nm$^3$-O$_2$-/t-C] | 426 | 317 | 412 | 285 | 167 |
| Partial pressure of oxygen in pressurized reaction vessel [kPaG] | 277 | 277 | 325 | 101 | 90 |
| ORP of leachate [mV] | 559 | 518 | 528 | 670 | 473 |
| Amount of sulfuric acid used [kg-H$_2$SO$_4$/t-dry solid] | 226 | 219 | 232 | 292 | 240 |

As shown in Table 1, it is found that, in Examples 1 to 4 in each of which the oxygen purity was adjusted to be in a range of approximately 45% to 55% and the oxygen blowing amount (blown oxygen flow rate) was approximately 310 to 430 $Nm^3$ per ton of the carbon amount, ORP was controlled to 535 mV on average, and thus, a leaching treatment was performed under an optimum ORP environment. Furthermore, the amount of sulfuric acid used was approximately 227 kg on average and 232 kg at the maximum per ton of dry ore, and thus, without using an excessive amount of sulfuric acid, the leaching treatment was performed.

On the other hand, in the case of Comparative Example 1 in which only high pressure air was blown in, the oxygen purity was 20.0% and the oxygen blowing amount was 285 $Nm^3$, but, the carbon grade in ore slurry was low, namely 0.21% by weight, and accordingly, the ORP of a leachate was maintained at approximately 670 mV. However, in Comparative Example 1, to reduce the carbon grade of solids in the ore slurry, the percentage of an low-carbon ore blended in was increased, and accordingly, the grade of magnesium (Mg) and aluminum (Al) increased. As a result, magnesium and aluminum acted as impurities in the high pressure acid leaching and consumed sulfuric acid, and accordingly, the amount of sulfuric acid used to maintain a predetermined free sulfuric acid concentration sharply increased, and consequently the amount was more than 270 kg per ton of dry ore.

Furthermore, in the case of Comparative Example 2 in which, since only high pressure air was blown in, a blowing amount of only approximately 167 $Nm^3$ per ton of the carbon amount was secured, ORP was less than 500 mV, and the amount of sulfuric acid reproduced by a high temperature hydrolysis reaction of iron in an autoclave decreased, and accordingly, sulfuric acid was additionally added in order to maintain a free acid concentration necessary for leaching, and as a result, the amount of sulfuric acid used was 240 kg per ton of dry ore.

As mentioned above, it was understood that the present invention is applied, and, in order to maintain an oxidizing atmosphere, a part of high pressure air to be used was replaced by high pressure oxygen to make oxygen purity higher and to increase an oxygen blowing amount, whereby the ORP of a liquid at the time of leaching was controlled to be in an optimum range, and thus, a high iron oxidation ratio to trivalent iron was achieved.

Furthermore, such operation enables an increase in carbon grade in a treated ore. That is, such operation makes it possible to select an ore mixing ratio which leads to a high carbon grade, whereby a limited component resource can be effectively utilized, and the grades of magnesium, aluminum, and the like, which each act as impurities in acid leaching, can be kept low. It was found that such operation makes it possible to prevent sulfuric acid from being consumed by these impurities in a leaching reaction and to reduce the amount of sulfuric acid used, thereby reducing the cost of a chemical agent, and furthermore, to improve a leaching rate of nickel and cobalt with respect to the amount of sulfuric acid used.

The invention claimed is:

1. A hydrometallurgical process for nickel oxide ore, the process comprising: a first step of slurrying a nickel oxide ore to prepare ore slurry; and a second step of adding sulfuric acid to the ore slurry and applying a leaching treatment using high pressure air and high pressure vapor to obtain a leachate containing nickel and cobalt;
wherein, in the second step, a ratio of a blown gas made up of high pressure air and high pressure oxygen so as to attain an oxygen is adjusted purity of 21% to 60%, and, while the oxygen purity is maintained, an oxygen blowing amount is adjusted to 200 to 600[$Nm^3$-$O_2$/t-C] per ton of carbon amount which is contained in the ore slurry and fed in the second step, whereby an oxidation-reduction potential (Ag/AgCl basis) in a leaching treatment is controlled to 400 to 650 mV.

2. The hydrometallurgical process for nickel oxide ore according to claim 1, wherein, in the first step, a carbon grade of solids in the ore slurry is adjusted to 0.1% to 0.5% by weight by a blending ratio of nickel oxide ore which have different carbon grades and constitute the ore slurry.

3. The hydrometallurgical process for nickel oxide ore according to claim 1, wherein, in the second step, a partial pressure of oxygen in a leaching vessel to perform a leaching treatment is adjusted to 100 to 400 kPaG.

4. The hydrometallurgical process for nickel oxide ore according to claim 1, wherein, in the second step, the high pressure air and the high pressure oxygen are mixed in advance so as to attain the ratio of the blown gas, and then, blown into a leaching vessel.

5. The hydrometallurgical process for nickel oxide ore according to claim 1, wherein an iron oxidation ratio in the leachate obtained in the second step is not less than 90%.

6. The hydrometallurgical process for nickel oxide ore according to claim 1, wherein an amount of sulfuric acid used in the second step is 200 to 250[kg-$H_2SO_4$/t-dry Solid] per ton of dry ore for the nickel oxide ore fed to be subjected to a leaching treatment.

* * * * *